United States Patent Office 3,320,924
Patented May 23, 1967

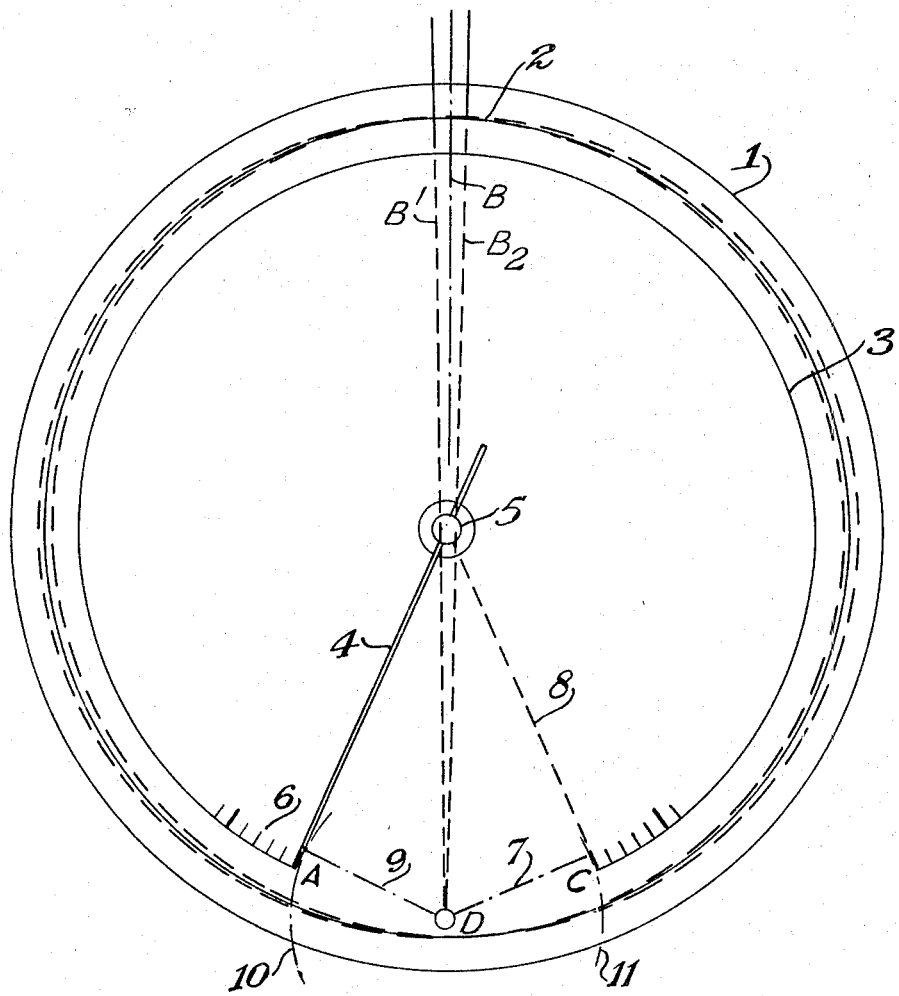

3,320,924
MEASURING INSTRUMENT
Thomas William Hurst, Aylesbury, England, assignor to Negretti & Zambra Limited, Aylesbury, England, a corporation of the United Kingdom
Filed May 10, 1965, Ser. No. 454,532
Claims priority, application Great Britain, May 15, 1964, 20,345/64
2 Claims. (Cl. 116—129)

This invention relates to measuring instruments such as pressure gauges and milliammetres of the type in which a pointer moves over an arcuate arithmetic scale on a dial with approximately linear movement.

Such known types of measuring instruments are approximately linear and are calibrated to printed scales to within some tolerance which depends on the maximum variation of scale shape which occurs from one movement to another. If the deviation exceeds the tolerance the scale may have to be specially pointed and finished for each particular movement, which procedure is expensive.

In such measuring instruments, it is possible normally to adjust the instrument to read correctly at zero and at full scale by adjusting the angular position of the movement and the length of throw of the pointer. In other words, the zero error is adjusted to nil, and the sensitivity is then adjusted so that the full scale reading is correct.

However, in these instruments, where movement is only approximately linear, deviations will occur for readings between the two set points at zero and full scale, and these deviations will be a maximum mid-way between the two set points. Sometimes these deviations can be overcome by adjustment of the parts within the movement, but this requires expert craftsman and large expense.

It is the object of this invention to provide measuring instruments of the above type in which true coincidence is achieved at three points on the scale, instead of the usual two, thereby minimising errors in readings taken between the zero and full scale marks.

According to the present invention, in measuring instruments of the type described, the dial is mounted for pivotal movement in its own plane about an axis situated on a diametral line through the midway point of the scale, whereby a true measurement is obtainable at zero, mid-point and full reading on the scale.

In most cases, it is convenient to define the pivotal axis of the dial as the point of intersection of two lines, one from the zero mark and the other from the full scale mark and each normal to an imaginary line joining the said marks to the pivotal axis of the pointer.

The invention will now be described with reference to the accompanying drawing which shows a diagrammatic plan view of the face of an approximately linear measuring instrument.

The instrument 1 has a dial 2 provided with an arcuate arithmetic scale 3. A pointer 4 is mounted for pivotal movement around the scale 3 about an axis 5. The scale 3 is divided into equal divisions 6, the zero mark being represented by the reference A and the full scale mark by the reference C. The mid-way mark is at B. The indicator is zeroized in a known manner so that the pointer co-incides with A when no measurement is taken, and with C when it is tested for full scale deflection. Since the movement is only approximately linear, the deviation of the pointer, when it is under test, in the middle of the scale may exceed the allowed tolerance, and hence it becomes necessary to alter the instrument to obtain a third true reading. Maximum deviation will occur at the mid-way mark B, and therefore this is the most desirable position to obtain a third point of coincidence.

For the sake of illustration, suppose that the pointer 4 is at a position $B_1$, when it should be in the position corresponding with the mid-way mark B. It is now necessary to pivot the dial anti-clockwise until the pointer and the mark B coincide. However, if the dial 2 is pivoted in a conventional manner about a substantially central point, i.e. coincident with the pivotal axis of the pointer, this will throw the zero and full scale marks A and C out of true position.

According to this invention, the dial 2 is mounted about a point D diametrically opposite the mark B. This point D is defined by drawing a line 7 through the full scale mark C normal to an imaginary line drawn between the mark C and the pivotal axis 5 of the pointer 4, and a similar line 9 through the zero mark A, and taking their point of intersection.

If the dial is now given freedom to pivot slightly about this point D, the actual angular position of the mark B can be altered to coincide with the actual position the pointer 4 assumes when under test, say $B_1$ and $B_2$. In making this adjustment, the angular position of the marks A and C does not alter to any sensible extent in relation to the correct pointer position, since these marks will move along respective arcs 10 and 11, their angular displacement about the axis 5 being negligible. Hence, the dial can be adjusted to give true coincidence at three positions instead of the usual two.

For the greatest accuracy, the lines 7 and 9 are drawn through points on the zero and full scale marks A and C at which the actual reading is taken. These points will normally correspond with the tip of the pointer 4.

The amount of adjustment which is achieved at points inbetween A and C is progressively increased towards the mid-point B. If the amount of adjustment is great then the dial would become too much displaced for easy reading and the result would be unsatisfactory, but for adjustments of the order of ±½% of scale the results are perfectly satisfactory.

What is claimed is:
1. A measuring instrument including a dial face, an arcuate arithmetic scale on said dial face, a pointer mounted for approximately linear, angular movement past said scale, means mounting said dial face for pivotal movement in its own plane about an axis situated on a diametral line through the midway point of said scale, whereby a true measurement is obtainable at zero, mid-point and full reading on said scale.

2. A measuring instrument including a dial face, an arcuate artithmetic scale on said dial face, a pointer mounted for approximately linear angular movement past said scale, means mounting said dial face for pivotal movement in its own plane about an axis defined by the point of intersection of two lines, one from the zero mark and the other from the full scale mark on said scale and each normal to an imaginary line joining said marks to the pivotal axis of the pointer, whereby true coincidence between pointer reading and correct reading is obtainable at zero, mid-point and full scale readings, on said scale.

No references cited.

LOUIS J. CAPOZI, Primary Examiner.